United States Patent
Suckow

(10) Patent No.: US 6,212,674 B1
(45) Date of Patent: *Apr. 3, 2001

(54) GRAPHIC CONTROL PROCESS FOR CONTROLLING OPERATIONS IN A NETWORK MANAGEMENT SYSTEM

(75) Inventor: Ralf Suckow, Berlin (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,577

(22) PCT Filed: Apr. 22, 1997

(86) PCT No.: PCT/EP97/02427

§ 371 Date: Jun. 12, 1998

§ 102(e) Date: Jun. 12, 1998

(87) PCT Pub. No.: WO97/40442

PCT Pub. Date: Oct. 30, 1997

(30) Foreign Application Priority Data

Apr. 22, 1996 (DE) ............................................. 196 15 683

(51) Int. Cl.[7] .................................................... G06F 9/45
(52) U.S. Cl. .................................. 717/1; 717/2; 709/220; 709/223; 345/329
(58) Field of Search ............................. 395/701; 717/1, 717/2; 709/220, 223

(56) References Cited

U.S. PATENT DOCUMENTS

| | | | |
|---|---|---|---|
| 4,949,253 | * 8/1990 | Chigira et al. | 717/2 |
| 4,958,773 | * 9/1990 | Saito et al. | 717/3 |
| 5,019,961 | * 5/1991 | Addesso et al. | 345/331 |
| 5,237,691 | * 8/1993 | Robinson et al. | 717/3 |
| 5,381,548 | 1/1995 | Matsuo . | |
| 5,388,258 | * 2/1995 | Larsson et al. | 707/104 |
| 5,471,399 | * 11/1995 | Tanaka et al. | 345/329 |
| 5,481,712 | 1/1996 | Silver et al. . | |
| 5,483,631 | * 1/1996 | Nagai et al. | 345/329 |
| 5,553,223 | * 9/1996 | Greenlee et al. | 709/220 |
| 5,559,958 | * 9/1996 | Farrand et al. | 709/223 |
| 5,590,271 | * 12/1996 | Klinker | 345/326 |
| 5,671,408 | * 9/1997 | McBride | 707/100 |
| 5,715,432 | * 2/1998 | Xu et al. | 345/356 |
| 5,724,273 | * 3/1998 | Desgrousilliers et al. | 717/1 |
| 5,740,439 | * 4/1998 | Atkinson et al. | 717/3 |
| 5,742,827 | * 4/1998 | Ohkubo et al. | 717/1 |
| 5,751,962 | * 5/1998 | Fanshier et al. | 709/223 |
| 5,758,160 | * 5/1998 | McInerney et al. | 717/1 |
| 5,774,689 | * 6/1998 | Curtis et al. | 345/343 |
| 5,790,760 | * 8/1998 | Arima | 717/1 |
| 5,828,842 | * 10/1998 | Sugauchi et al. | 709/223 |

(List continued on next page.)

OTHER PUBLICATIONS

Schmidt et al.; "Do–It–Yourself TMN Applications by Visual Programming Methods". IEEE/IEE Electronic Library[online], IEEE Communications Magazine, vol. 33, Iss. 11, pp. 72–76, Nov. 1995.*

(List continued on next page.)

Primary Examiner—Mark R. Powell
(74) Attorney, Agent, or Firm—Ware, Fressola, Van Der Sluys & Adolphson LLP

(57) ABSTRACT

A process is disclosed for generating control operations of network elements by means of a graphic control. A program for controlling the operations contains command templates for the operation steps and additional control instructions for linking these command templates (sequences, branches, loops). In a first step, run the control instructions to build-up a graphic program flow chart and skip the command templates for the corresponding operation steps. In a second step, run a command template of a desired operation step based on a given input, and skip the command templates of the remaining operation steps.

13 Claims, 7 Drawing Sheets

U.S. PATENT DOCUMENTS

| | | | |
|---|---|---|---|
| 5,832,503 | * 11/1998 | Malik et al. | 707/104 |
| 5,838,563 | * 11/1998 | Dove et al. | 700/83 |
| 5,845,119 | * 12/1998 | Kozuka et al. | 717/2 |
| 5,872,928 | * 2/1999 | Lewis et al. | 709/222 |
| 5,893,105 | * 4/1999 | MacLennan | 707/102 |
| 5,909,368 | * 6/1999 | Nixon et al. | 700/83 |
| 5,917,730 | * 6/1999 | Rittie et al. | 703/6 |
| 6,040,834 | * 3/2000 | Jain et al. | 345/356 |

OTHER PUBLICATIONS

Chew et al.; "An object–oriented GDMO tool for network management". IEEE/IEE Electronic Library[online], International conference on information engineering, vol. 1, pp. 344–348, Sep. 1993.*

Yata et al.; "ATM transport network operation system based on object–oriented technologies". IEEE/IEE Electronic Library[online], IEEE Global Telecommunications Conference, vol. 2, pp. 838–842, Dec. 1994.*

Frohnhoff et al.; "An advanced TMN test system–TSE–P". IEEE/IEE Electronic Library[online], IEEE Network Operations and Management Symposium, vol. 2, pp. 444–453, Apr. 1996.*

Sugauchi et al.; "A method to develop common management service in many management application programs based on management service specification using GDMO template". IEEE/IEE Electronic Library[online], IEEE Network Operations and Management Symposium, Apr. 1996.*

Liu et al.; "Visualization in network topology optimization". ACM Digital Library[online], 1992 ACM annual computer science conference, pp. 131–137, Mar. 1992.*

"Do–It Yourself TMN Applications by Visual Programming Methods" by Schmidt et al IEEE Communications, Nov. 1995. pp. 72–76.

"I–Pigs: An Interactive Graphical Environment for Concurrent Programming" by Pong MC pp. 320–330. in Computer Journal.

"Do It Your TMN Applications by Visual Programming Methods" by Schmidt et al, International Switching Symposium Apr. 1995, vol. 2, B 8.2.

* cited by examiner 100   if (Box.begin (0, "Step 1")){

< Command Template 1>

}

200   if (Box.begin (1, "Step 2")){

< Command Template 2>

}

```
    import scman.scenario;

public class ExampleScenario extends Scenario
    {
5   int a, b;
        public void perform ()
        {
            BLOCK ("Task 1"); if (execute)
10          {
                a=3;
                b=3;
                System.out.println ("performing task 1");
            }
15
            IF ("Decision 1"); if (execute)
            {
                ANSWER = (a1=b);
                System.out.println ("decision 1, answer="+ANSWER);
20          }
            THEN ();
                IF ("Decision 2"); if (execute)
                {
25                  ANSWER = (a==2);
                    System.out.println ("decision 2, answer="+ANSWER);
                }
30          THEN ();
                BLOCK ("Task 2"); if (execute)
                {
                    System.out.println ("performing task 2");
35              }
            ENDIF ();
                BLOCK ("Task 3"); if (execute)
40              {
                    System.out.println ("performing task 3");
                }
                ⇓
                A                           FIG.3a
```

```
          A
          ⇓

44    ELSE ();
         WHILE ("Decision 3"); if (execute)
         {
             ANSWER=(b > 0);
             System.out.println ("decision 3, answer="+ANSWER);
50       }
         BLOCK ("Task 4"); if (execute)
         {
             System.out.println ("performing task 4");
             b--;
55       }
         ENDWHILE ();
      ENDIF ();
60    }
   }
```

FIG.3b

```
70      public void parse ()
        {
            . . .
100         appendOperator (new Start (this, 0, "Start"));

runningNumber=1;
            scanning=true;
            perform ();
105
            appendOperator (new Stop (this, runningNumber; "Stop"));
            . . .

}
200     void performNumber (int number)
        {
            runningNumber=1;
            numberToExecute=number
            scanning=false;
205         perform ();

}

300     public void BLOCK (String label)
        {
            if    (scanning)   {
                appendOperator (new Block (this, runningNumber, label));
                execute=false;
305         } else
                execute=(runningNumber==numberToExecute);

running Number++;
310     }
```

```
400    public void IF (String label)
       {
               if      (scanning)      {
                       appendOperator (new IF (this, runningNumber, label));
                       execute=false;
405            }
               else
                       execute=(runningNumber==numberToExecute);

running Number++;
410    }

500    public void WHILE (String label)
       {
               if      (scanning)      {
                       appendOperator (new WHILE (this, runningNumber, label));
                       execute=false;
505            }
               else
                       execute=(runningNumber==numberToExecute);

running Number++;
510    }
```

FIG.3c-2

GRAPHIC CONTROL PROCESS FOR CONTROLLING OPERATIONS IN A NETWORK MANAGEMENT SYSTEM

TECHNICAL FIELD

The present invention concerns a method and a control device for graphically controlling operations in a network management system.

BACKGROUND OF THE INVENTION

In a network management system, operators design programs to create operations for controlling network elements. Such an operation is a sequence of application requests, of control functions, of assignments etc. in the network management system. To create the operations the operators use special script languages which enable an inexperienced programmer to define complex management tasks in a simple and understandable manner. Such script languages are proprietary and converting the statements of the script language into statements of a more comfortable higher programming language for execution of the management tasks requires the development of a special interpreter.

It is known from "Do it yourself TMN applications by visual programming methods" by C. Schmidt et al, International Switching Symposium April 1995, Volume 2, B 8.2, that the statements in the script language can be supported by optical programming techniques, such as by means of hypertext structures. In the known programming manner of the above article, predefined blocks (templates) are built and correspond to a statement in the script language. The blocks are displayed in hypertext on a screen and an operator can use a mouse to connect the blocks to each other in the desired manner. The operations for controlling the network elements are constructed in this way. The proposed optical programming technique only provides the operator with an indication of the operation by means of text and graphics. Processing the information of the individual operation steps, i.e. loops, conditions, etc. for linking the operation steps, must be created by the operator himself with the script language.

SUMMARY OF THE INVENTION

It is the object of the present invention to enable a simple control of network elements by an operator in a network management system. This object is achieved by a method for graphically controlling a process with several operation steps in a network management system, wherein command templates are used to perform the respective operation steps, and control instructions to link the command templates; wherein the control instructions are carried out to build a program flow chart of the process on a display device; wherein those operation steps which can be performed on the basis of a specified process situation are identified; wherein the input for selecting one of the identified operation steps is received, and wherein the specific command template of the selected operation step is subsequently executed.

Because of the invention, it is advantageously no longer necessary for the operator to have knowledge of the linkage of the different operation steps to actually perform the operation.

BRIEF DESCRIPTION OF THE DRAWINGS

Advantageous embodiments of the invention can be found in the dependent claims.

The invention is described for clarification in the following by means of embodiments and FIG. 1 to 3, wherein.

BEST MODE FOR CARRYING OUT THE INVENTION

The present invention is used in a network management system of a telecommunications network. A network management central therein controls network elements of the telecommunications network. Such network elements are for example switching centers, data bases, access networks, etc. In that case operators create operations for controlling the network elements. Such an operation can be for example setting up a connection line between two switching centers, the installing, changing or deleting a subscriber in a switching center, etc. Such a process is made up of several operation steps. The operator describes the operations with a program in a programming language that includes command templates for performing the respective operation steps, and control instructions for linking the command blocks. In that case the command blocks and the control instructions are advantageously written in the same programming language. A convenient programming language for the present invention is the programming language JAVA. The programming language which is used must have a simply constructed syntax with few data types, so that even an operator with little programming experience is able to formulate instructions in this language. The programming language should have a modular structure and the modules in particular should be dynamically insertable during the program flow. Such modules are independent of each other and each one performs a partial task, such as for example for the graphic control, the man-machine communication, to link data base, etc. It is an advantage that it is possible to insert modules from third party manufacturers. When JAVA is used as the programming language, interpreters are already available. Such a JAVA interpreter can be for example a JAVA-capable worldwide web browser, such as e.g. Netscape 2.0, or a JAVA interpreter such as Applet-Viewer.

Figure 1:
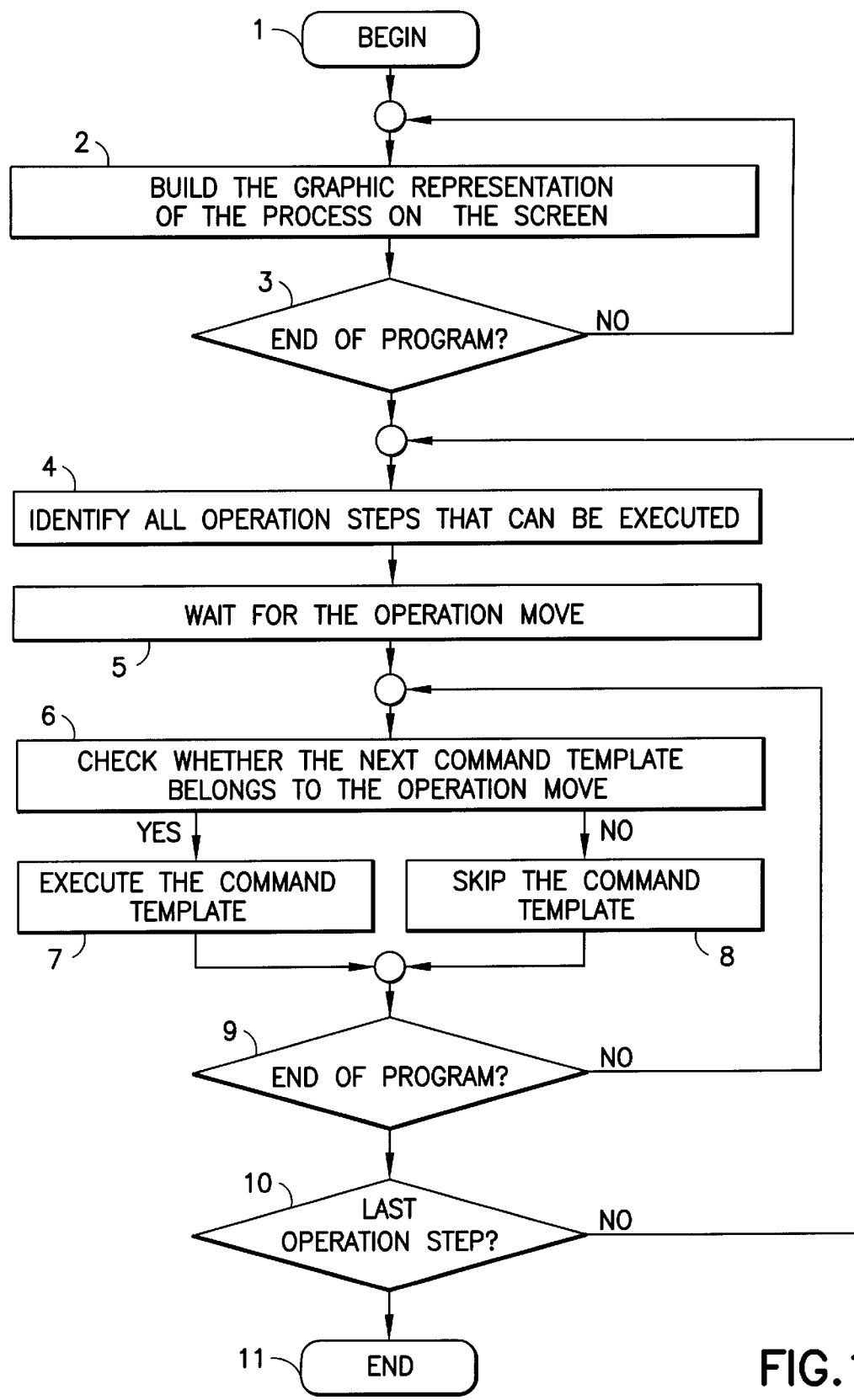
FIG. 1 is a flow diagram of a first embodiment of the invention.

FIG. 1 shows the flow diagram of the first embodiment of the invention. The process of the invention begins in a step 1. In a step 2 the graphic display of the operation is built up in the form of a program flow chart on a screen of the network management central. To that end the existing control instructions in the program are carried out to link the command templates. During this run of the program the command templates for performing the operation steps are skipped. After the program flow chart is established, a check of whether the program has ended is carried out in a step 3. If this is not the case, the process branches back again to step 2. If this is the case, a step 4 follows in which all the operation steps that can be performed on the basis of the momentary process situation are identified. Such an identification can be for example a color change in the graphic display of the respective performable operation steps in the program flow chart. But it is also possible to use another identification of the performable operation steps. Based on this identification of the performable operation steps, the operator is immediately aware of the control possibilities that exist for the operation, and which operation step could be selected as the next one. In a step 5 the process of the invention waits for the operator to make an operation move.

Such a move could be for example a mouse click in the graphic display of the selected operation step in the program flow chart. Subsequently the program is executed again. In that case the commands for building the graphic display of the individual operation steps for the program flow chart are skipped. A check is performed in step 6 as to whether the next command template in the program execution is the command template for performing the selected operation step. If this is the case, this command template and the pertinent operation step selected by the operator is performed in a step 7. If the next command template does not belong to the selected operation step, this command template is skipped in a step 8. A check is performed in step 9 as to whether the end of the program has been reached. If this is not the case, the process of the invention branches back to step 6 in order to execute the program and continue with the checking of the next command template. If it is determined in a step 9 that the end of the program has been reached, a check is performed in step 10 as to whether the last operation step of the process has been reached. If this is not the case, the process of the invention branches back to step 4 and identifies all the operation steps that can be selected by the operator, based on the new process situation which took place after step 5, whereby the command template was selected, was carried out. Steps 5 to 10 are then repeated as described above. If it is determined in step 10 that the last step of the operation has been reached, the process of the invention ends in step 11.

Figures 2A, 2B:
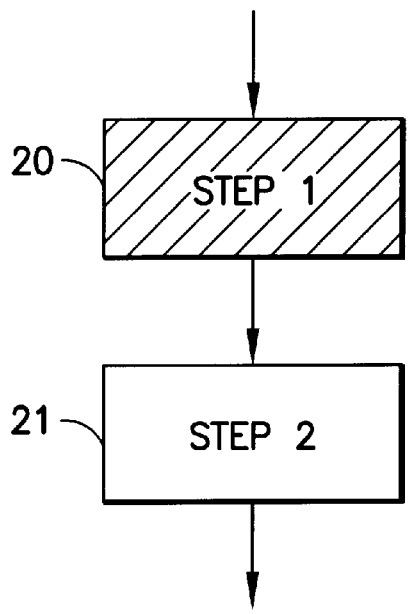
FIG. 2 a–b is a second embodiment of the invention.

FIG. 2a and b illustrate the second embodiment of the invention. FIG. 2a shows an excerpt from a possible program for establishing an operation. FIG. 2b shows a program flow chart for this operation. The program excerpt in FIG. 2a is written in the programming language JAVA. A control instruction for building a graphic display of a first operation step is defined in line 100. Box is an object class combining functions which are able to process a predetermined data structure. In that case box.begin is such a function of the object class Box in the programming language JAVA, whereby the graphic display of the first operation step is done in the form of a box as shown in a box 20 of FIG. 2b. Zero is used to identify the command template assigned to this operation step in the internal display. The indication "step 1" means that the text "step 1" is to be written into the box 20 of FIG. 2b. The indication "step 1" represents a designation of the first operation step for display in the program flow chart of FIG. 2a. The control instruction in line 100 is followed by a command template 1 for performing the first operation step. This command template is not illustrated in detail in FIG. 2a. A control instruction for building a graphic display of a second operation step in the form of a box 21 according to FIG. 2b is defined in line 200. The number 1 is used to internally identify a command template 2 for performing the second operation step. "Step 2" is a designation to be written into the box 21 of FIG. 2b to graphically display the second opetation step in thepor-gram flow chart. "Step 2" is a designation of this second operation step. The command template 2 for performing the second operation step follows next in FIG. 2a. FIG. 2 does not illustrate this command template 2 in detail.

The operator uses a two-step execution mechanism of the program to carry out the invention. in the present embodiment the function box.begin is used for both the display of the respective operation step in the program flow chart, as well as for the execution of the command template of the respective operation step. The response of the function box.begin depends on the value of a global variable which the function box.begin accesses. Such a global variable can be used for all the functions, in contrast to a local variable the use of which is limited to one function.

In the first execution of the program of FIG. 2a this global variable, which is not illustrated in FIG. 2a, has a first value A. In this case the function box.begin builds the box 20 of FIG. 2b in accordance with the control instruction in line 100. This box 20 is internally identified by zero and is designated as "step 1". The command template 1 assigned to the first operation step is skipped. The same applies respectively to the control instruction in line 200 of FIG. 2a. After this first execution of the program is completed, a program flow chart of FIG. 2b is displayed on the screen of the network management central. Subsequently the program evaluates current data of the network elements in order to determine the current process situation. The performable operation step in the program flow chart is now identified in accordance with this process situation, for example by a color change, and the program awaits an operation move by the operator for selecting the performable operation step. In the present embodiment, the first operation step is the performable operation step.

In the second execution of the program, the global variable has a second value B. As soon as the operator selects the first operation step, for example by clicking the mouse on the box 20, the control instruction in line 100 is carried out so that it again accesses the global variable and executes the command template 1 assigned to the first operation step. In the second operation step, its control instruction for building the graphic display of the second operation step and for executing the command template 2 are skipped. Subsequently the program again evaluates the current data of the network elements after performing the first operation step, in order to determine the current process situation. The now performable operation step, for example the second operation step, is identified and a new input is awaited through an operation move to select the performable operation step.

Figure 3D:
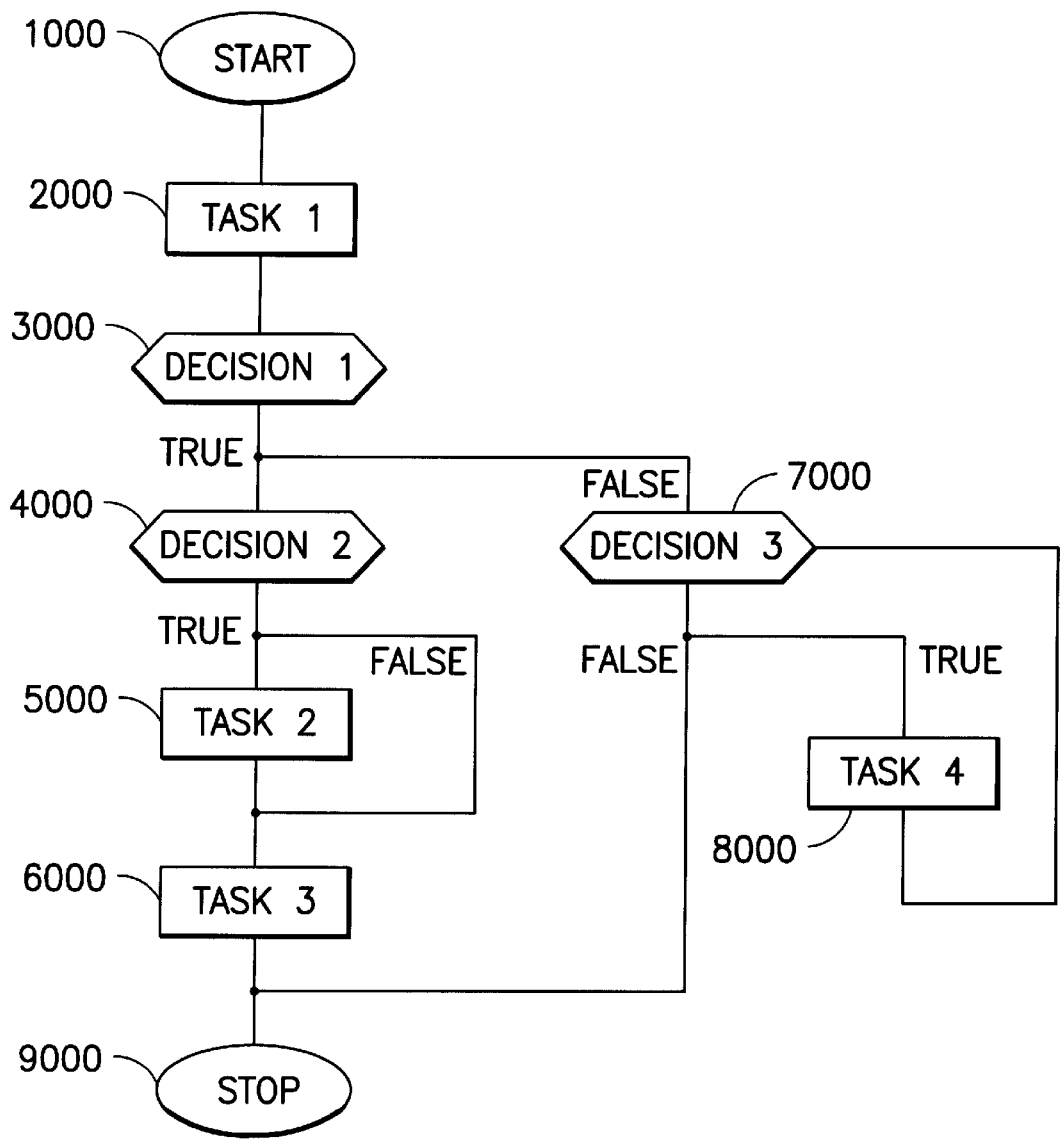
FIG. 3 a–d is a third embodiment of the invention.

FIG. 3a to 3d show a third embodiment of the invention. FIG. 3a and 3b depict a program for defining a process. FIG. 3d shows the pertinent program flow chart of this process, and FIG. 3c a program for executing the process. The programs are written in the programming language JAVA.

In the program for defining the process of FIG. 3a, 3b, a library with the name 'scman' is loaded in line 1. This library contains different object classes. One of these object classes is the class scenario. The class scenario includes functions for the establishment of operations that are able to process the same data structures. In lines 3 and 7 the function 'perform' is added to the functions of the class 'scenario'. The function 'perform' establishes the present process. The process contains seven operation steps which are interlinked due to the control instructions in the program for defining the process of FIG. 3a, 3b. A first task 1 is defined in a first operation step. This first task is established in lines 9 to 14 of FIG. 3a and is represented as step 2000 in FIG. 3d in the form of a box in the program flow chart. A first decision 1 follows as the second operation step, which is established in lines 16 to 20 in FIG. 3a and is represented in step 3000 of FIG. 3d. The second operation step examines a condition. If this condition is fulfilled, a third operation step follows in the form of a second decision 2, which is established in lines 24 to 28 of FIG. 3a and is represented as step 4000 in FIG. 3d. This second decision examines a further condition. If this further condition is fulfilled, a fourth operation step follows in the form of a second task 2, which is established in lines 32 to 35 of FIG. 3a and is represented as step 5000 in FIG. 3d. If the further condition which is examined during the second decision in step 4000 is not fulfilled, the fourth operation step is skipped. This is followed by a fifth operation step in the form of a third task 3, which is established in lines 39 to 42 of FIG. 3*a* and is represented as step 6000 in FIG. 3*d*. The process ends if a third task 3 was carried out. This is represented in a step 9000 in FIG. 3*d*. If the condition that was examined during the first decision in the second operation step is not fulfilled, after the second operation step a branch is extended to a sixth operation step. This sixth operation step is a third decision 3 which is established in lines 46 to 50 and is represented as a step 7000 in FIG. 3*d*. Another condition is examined in this sixth operation step. If this other condition is fulfilled, a seventh operation step follows in the form of a fourth task 4. This fourth task 4 is established in lines 51 to 55 and is represented as its step 8000 in FIG. 3*d*. After the seventh operation step the process branches again to the sixth operation step by means of the third decision. The process ends if the other condition examined in the sixth operation step is not fulfilled. This is represented in the step 9000 of FIG. 3*d*.

FIG. 3*c* depicts a part of a program for executing the process. By means of a function 'parse', in line 70 of FIG. 3*c*, a first execution of the program for building the program flow chart of FIG. 3*d* is started. The graphic display of the start of step 1000 of FIG. 3*d* is produced in the program flow chart by means of the command 'appendOperator' in line 100. In line 102 an internal counter with the designation 'runningNumber' is set to 1. In line 103 the value 'true' is allocated to a global variable 'scanning'. This global variable 'scanning' indicates whether the graphic display of the respective operation step is to be produced in the program flow chart during the execution of the program, based on the control instruction in the program for defining the process of FIG. 3*a*, 3*b*. The graphic display is produced if the global variable 'scanning' has the value 'true'; the graphic display is not produced if the global variable 'scanning' has the value 'false', and a decision is made about the execution of the assigned command template. In line 104 the function 'perform' is called up whereby the process of FIG. 3*a*, 3*b* is defined. The command BLOCK is called up for the first operation step in line 9 of FIG. 3*a*. This command BLOCK is defined in lines 300 to 310 of FIG. 3*c*. In lines 302 to 307 the response of the command BLOCK is established in the form of a condition. In line 302 the value of the variable 'scanning' is checked. The global variable 'scanning' has the value 'true' based on the determination in line 103 of FIG. 3*c*. The condition in line 302 is therefore fulfilled and the commands in lines 303 and 304 are then executed. By means of line 203 and the command 'appendOperator', a new operation step in the form of the box 2000 with the label of task 1 is entered into the program flow chart of FIG. 3*d*. A number for the internal display is assigned to this first operation step. In the present case this number corresponds to the value of the internal counter 'runningNumber'. Since according to line 102 the value of the 'runningNumber' is 1, the number of the first operation step for the internal display is 1. In line 304 the value 'false' is assigned to a variable 'execute'. The command in line 307 is not executed since the condition according to line 302 has been fulfilled, because the global variable 'scanning' has the value 'true'. In accordance with line 309 of FIG. 3*c*, the value of the internal counter 'runningNumber' is subsequently increased by 1 to the value of 2. The program then jumps again to line 9 in FIG. 3*a* and checks the value of the variable 'execute'. Since the variable 'execute' was set to "false" in line 304 of FIG. 3*c*, the condition in line 9 of FIG. 3*a* is not fulfilled and the commands in lines 10 to 14 of FIG. 3*a* are skipped.

In line 16 of FIG. 3*a* the function 1F is called up. This function 1F is defined in lines 400 to 410 of FIG. 3*c* and corresponds broadly to the definition BLOCK in lines 300 to 310 of FIG. 3*c*, except that instead of the box for the graphic display of a task in the program flow chart of FIG. 3*d*, a rhomboid-shaped graphic display is provided for a decision in the program flow chart. The value of the global variable 'scanning' is checked in accordance with line 402. Since this value is 'true' according to the determination in line 103, the condition of line 402 is fulfilled and the second operation step 3000 is entered into the program flow chart of FIG. 3*d* by means of the command 'appendOperator'. The internal number 2, which corresponds to the current value of the internal counter 'runningNumber', is allocated to the second operation step 3000. Then the value of the variable 'execute' is set to 'false' in line 404, and the command in line 407 is subsequently skipped since the condition in line 402 has been fulfilled. Then the value of the internal counter 'runningNumber' is increased by 1 to 3 in line 409. Subsequently in line 16 of FIG. 3*a* the value of the variable 'execute' is checked. Since the variable 'execute' has the value 'false', the condition is not fulfilled and the commands in lines 18 and 19 of FIG. 3*a* are skipped. Accordingly the third, fourth and fifth operation steps are shown as graphic displays in the program flow chart according to FIG. 3*d* and the instructions in lines 22 to 42 of FIG. 3*a*. In line 46 of FIG. 3*b* a WHILE function is called up. This WHILE function is established in lines 500 to 510 of FIG. 3*c*. The establishment of the WHILE function corresponds to that of the BLOCK and IF function. As with the IF function, here a rhomboid-shaped graphic display is built in the program flow chart of FIG. 3*d*, in this case for the sixth operation step. In contrast to the IF function, the WHILE function causes the process to branch back to this sixth operation step after the command END-WHILE in line 57 of FIG. 3*b* is recognized. After the completion of this first execution of the 'perform' function, step 106 of FIG. 3*c* builds a graphic display for the end of the process in the program flow chart by means of the command 'appendOperator'. This graphic display is given the designation 'stop'.

Subsequently the instructions for the evaluation of the data of the network management system, which are not illustrated in FIG. 3*c*, are carried out to determine a now available current process situation. In accordance with this evaluation the process of the invention marks those operation steps which can be performed on the basis of the momentary process situation. As already mentioned, such a marking can be a color change in the performable operation step of the program flow chart. The program then waits for an operation move to select one of the performable operation steps. If such an operation move is received in the form of an input, for example a mouse click, the second execution of the program is started in line 200 of FIG. 3*c*. In line 201 the internal counter 'runningNumber' is again set to 1. In line 202 the value of the variable 'number' is allocated to the variable 'numberToExecute'. This variable 'number' has the value of the number of the internal display of the respective operation step that was selected with the operation move. For example if the operation move selected the first operation step 2000, the variable 'numberToExecute' now receives the value of 1, which corresponds to the number of the internal display of the first operation step. Subsequently in line 204 the value 'false' is allocated to the global variable 'scanning'. This means that when the function 'perform' is called up in line 205, the control instructions for building the program flow chart are skipped. When the function 'perform' is called up in line 205, the command BLOCK is again called up in accordance with line 9 in FIG. 3*a*. As already described earlier, this command BLOCK is determined in lines 300 to 310 of FIG. 3c. The value of the global variable 'scanning' is then checked in line 302. Since 'scanning' was set to 'false' in line 204, the condition in line 302 is not fulfilled and the commands in lines 303 and 304 are skipped. The command in line 307 of FIG. 3c is now executed. Line 307 either allocates the value 'true' or the value 'false' to the variable 'execute'. This depends on whether the momentary value of the internal counter 'runningNumber' is identical to the value of the variable 'numberToExecute'. If the value of the internal counter 'runningNumber' is identical to the value of the variable 'numberToExecute', the variable 'execute' receives the value 'true'. If the values are not the same, the value 'false' is allocated to the variable 'execute'. Since in line 202 the value 1 was allocated to the internal counter 'runningNumber', and in line 203 the number 1 of the internal display of the selected first operation step was allocated to the variable 'numberToExecute', the variable 'execute' now receives the value 'true'. Subsequently in line 309 the internal counter 'runningNumber' is increased by 1 to 2. Then in line 9 of FIG. 3a the value of the variable 'execute', is checked. The value 'true' was allocated to the variable 'execute', the condition in line 9 of FIG. 3a is fulfilled and the instructions in lines 11 to 13 of FIG. 3a are carried out. This means that the user-specific variables 'a' and 'b' are respectively allocated the value of 3, and the text 'performing task 1' is displayed on the operator's screen in accordance with the instruction in line 13. In this case the instructions in lines 12 to 14 of FIG. 3a correspond to the command template that is assigned to the first operation step. This command template is only executed if in response to the inquiry in line 9 in FIG. 3a the variable 'execute' has the value 'true'. However as provided in line 307 of FIG. 3c, this is only the case if the first operation step was selected through the operation move.

Subsequently in line 16 of FIG. 3a the function IF is called up again. As already mentioned earlier, this function IF is established in lines 400 to 410 of FIG. 3c. The in line 402 the value of the global variable 'scanning' is checked. Since the global variable 'scanning' has the value 'false' as established in line 204, the commands in lines 403 and 404 are skipped and the command in line 407 is executed. The value of the internal counter 'runningNumber' now is 2 and does not coincide with the value of the variable 'numberToExecute', which is 1 due to the selection of the first operation step. The value 'false' is therefore allocated to the variable 'execute'. Subsequently in line 409 the internal counter 'runningNumber' is increased by 1 to 3. In line 16 of FIG. 3a the value of the variable 'execute' is checked again. Since its value is 'false', the condition is not fulfilled and the instructions in lines 18 and 19 are skipped. Since the second operation step 3000 was not selected through the operation move, the command template assigned to this second operation step in lines 18 and 19 of FIG. 3a is skipped. The same applies to the command templates of the other operation steps.

If the execution of the function 'perform' is completed, other operation steps are again marked on the basis of the changed current process situation and an operation move is awaited. If such an operation move is received because of the selection of a performable operation step, the function 'perform' is again executed as described earlier in lines 200 to 206 of FIG. 3c. In that case the program processes all the operation steps defined by the function 'perform', but only executes the command template of the particular operation step that was selected through the operation move. The process of the invention ends after the last operation step has been performed. In the present case this is the performance of the fifth operation step with the third task 3, or the nonfulfillment of the other condition according to the third decision 3 in the sixth operation step.

Thus a single command executes both the control instruction for building the graphic display of an operation step in the program flow chart, as well as the command template assigned to the respective operation step. In the present embodiment such commands are BLOCK, IF and WHILE. The response of these commands, i.e. either building the graphic display of the respective operation step or executing the designated command template, depends on the value of the global variable 'scanning'. The execution of the command template additionally depends on the value of the variable 'execute'.

What is claimed is:

1. A method for graphically controlling a specified process with several operation steps for controlling network elements in a network management system of a telecommunication network, said method including the steps of:

describing the operation steps with a program in a programming language including a plurality of command templates graphically identifying possible operation steps which can be performed on the basis of the specified process and a plurality of control instructions;

selecting the command templates from the identified operation steps;

linking the selected command templates according to the control instructions in order to build a program flow chart of the specified process on a display device; and executing the identified operation steps in accordance with the program flow chart.

2. A method as claimed in claim 1, characterized in that a command is uded both to display one of the operation steps in the program flow chart, as well as to perform this operation step.

3. A method as claimed in claim 2, characterized in that the command templates for performing the respective operation steps and the control instructions for linking the command templates are written in the same programming language.

4. A method as claimed in claim 2, characterized in that the command accesses a global variable which is used to determine whether or not the command template of the operation step is executed.

5. A method as claimed in claim 4, characterized in that an internal counter assigns a specific number for the internal display of the respective operation step to the individual operation steps of the process during the building of the program flow chart, and that this specific number is used to determine whether the command template of the respective operation step is executed.

6. A method as claimed in claim 1, characterized in that the command templates for performing the respective operation steps and the control instructions for linking the command templates are written in the same programming language.

7. A method as claimed in claim 1, wherein the network elements include switching centers, databases and access network.

8. A method as claimed in claim 7, wherein the control instructions include the instruction to set up a connection line between switching centers.

9. A method as claimed in claim 7, wherein the control instructions include installing, changing or deleting a subscriber in one of the switching centers.

10. A method as claimed in claim 1, wherein the program language has a modular structure and includes a plurality of modules so as to allow the modules to be dynamically inserted in the program flow chart.

11. A method for a graphical control of a specified operation in a network management system, wherein the specified operation comprises a plurality of operation steps and wherein the specified operation is formed from a plurality of instruction blocks for executing the respective operation steps and a plurality of control directives for linking the instruction blocks, wherein the instruction blocks are used to be graphically identified on a display device possible operation steps which can be performed on the basis of the specified process, said method comprising the sequential steps of:

a) selecting the instruction blocks from the graphically identified operation steps;

b) linking the selected instruction blocks on the display device according to the control directives in order to build a graphical program operation plan of the specified operation; and c) executing the grahically identified operation steps according to the graphical program.

12. A method as claimed in claim 11, wherein the instruction blocks for executing the respective operation steps and the control directives for linking the instruction blocks are written in the same programming language and form a program for defining the operation.

13. A method as claimed in claim 12, wherein the program for defining the operation is written in the programming language JAVA.

* * * * *

UNITED STATES PATENT AND TRADEMARK OFFICE
CERTIFICATE OF CORRECTION

PATENT NO.   : 6,212,674 B1
DATED        : April 3, 2001
INVENTOR(S)  : Suckow

It is certified that error appears in the above-identified patent and that said Letters Patent is hereby corrected as shown below:

Title page,
Item [56] "References Cited", U.S. Patent Documents", "Saito et al.", patent No. 4,958,773" should be -- 4,956,773 --.

Item [56] "References Cited", U.S. Patent Documents", please correct the following Class/Subclasses:

| | |
|---|---|
| Addesso et al. | "345/331" should be -- 364/192 -- |
| Larsson et al. | "707/104" should be -- 395/600 -- |
| Greenlee et al. | "709/220" should be -- 395/155 -- |
| Farrand et al. | "709/223" should be -- 395/183.03 -- |
| Klinker | "345/326" should be -- 395/326 -- |
| Xu et al. | "345/356"should be -- 395/500 -- |
| Desgrousilliers et al. | "717/1"should be -- 64/580 -- |
| Atkinson et al. | "717/3"should be -- 95/701 -- |
| Ohkubo et al. | "717/1" should be -- 395/701 -- |
| McInerney et al. | "717/1"should be -- 395/701 -- |
| Dove et al. | "700/83"should be -- 364/188 -- |
| Nixon et al. | '700/83"should be -- 364/131 -- |
| Rittie et al. | "703/6"should be 364/578 -- |

Column 8,
Line 33, (claim 2, line 2), "uded" should be -- used --.

Column 10,
Line 5, "grahically" should be -- graphically --.

Signed and Sealed this

Sixteenth Day of October, 2001

Attest:

NICHOLAS P. GODICI
Attesting Officer    Acting Director of the United States Patent and Trademark Office